United States Patent [19]

Schubert et al.

[11] Patent Number: 5,042,858
[45] Date of Patent: Aug. 27, 1991

[54] ANTI-CRASH DEVICE

[75] Inventors: Klaus Schubert, Wessling; Gerhard Rieck, Munich, both of Fed. Rep. of Germany

[73] Assignee: Man Nutzfahrzeuge GmbH, Munich, Fed. Rep. of Germany

[21] Appl. No.: 317,534

[22] Filed: Mar. 1, 1989

[30] Foreign Application Priority Data

Mar. 16, 1988 [DE] Fed. Rep. of Germany ....... 3808812
Mar. 16, 1988 [DE] Fed. Rep. of Germany ....... 3808813

[51] Int. Cl.⁵ .................................. B60R 19/24
[52] U.S. Cl. ..................... 293/24; 293/118; 293/131; 296/180.5
[58] Field of Search ............ 293/24, 102, 103, 112, 293/114, 118, 119, 131, 134, 149, 150, 117, 26, 27; 180/271, 282, 274; 267/139; 296/180.5, 180.1

[56] References Cited

U.S. PATENT DOCUMENTS

| 1,232,220 | 7/1917 | Cheatham | 293/118 X |
| 2,102,120 | 12/1937 | Hevenor | 293/134 |
| 2,603,517 | 7/1952 | Zitarosa | 293/118 X |
| 3,346,292 | 10/1967 | Lundman | 293/118 X |
| 3,801,147 | 4/1974 | Barrett et al. | 293/118 X |
| 3,823,968 | 7/1974 | Barenyi | 293/131 |
| 3,847,427 | 11/1974 | Eshelman | 293/119 X |
| 3,848,914 | 11/1974 | Wathen | 293/131 X |
| 3,992,047 | 11/1976 | Barenyi et al. | 293/117 X |
| 4,401,339 | 8/1983 | Rios | 293/118 X |
| 4,407,388 | 10/1983 | Steel | 180/271 |
| 4,518,183 | 5/1985 | Lee | 188/271 X |

FOREIGN PATENT DOCUMENTS

| 0179434 | 10/1984 | Japan | 293/103 |
| 2084944 | 4/1982 | United Kingdom | 293/118 |

Primary Examiner—Robert J. Oberleitner
Attorney, Agent, or Firm—Ladas & Parry

[57] ABSTRACT

In order to prevent a car being run over or run onto by a commercial vehicle with which it collides, an anti-crash system is proposed for commercial vehicles which on the one hand absorbs kinetic energy and on the other hand is able to deflect a colliding car. For this purpose, beneath the conventional bumper, there is provided a spoiler which is either rigidly connected with the commercial vehicle, is curved forwards in the longitudinal direction of the vehicle or is formed by a plurality of components which are able to be moved out forards by a measuring and range finding sensor and a suitable operating system. The components are then so aligned that they are able to deflect the colliding car.

12 Claims, 4 Drawing Sheets

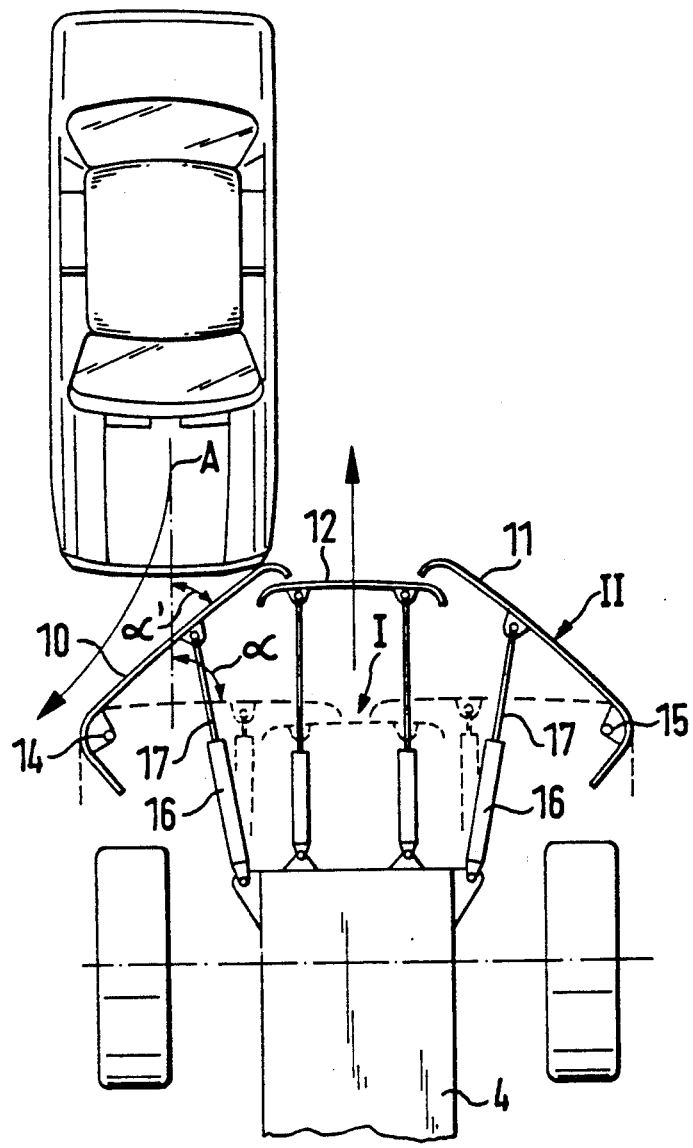
FIG.5
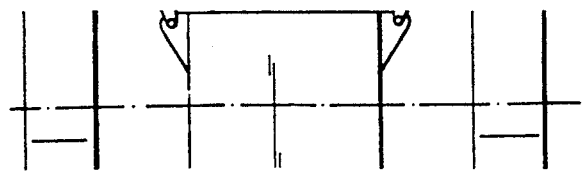

ANTI-CRASH DEVICE

BACKGROUND OF THE INVENTION

The invention relates to an anti-crash device comprising an energy absorbing structure for commercial vehicles which at their front end are provided with a bumper and a front spoiler.

When a commercial vehicle collides head-on with a car the risk of injury is very much more likely in the car. Owing to the very different masses and momentums of the two vehicles the changes of injury are considerably higher for the driver or other occupant of the car than for the driver of the commercial vehicle when there is a head-on crash. A further problem in addition to the unequal masses of the two vehicle is the fact that the car is unable to be pushed out of the way by the commercial vehicle since the energy is transferred to the car at a height above the road surface at which the car does not have any energy absorbing structure. The car is thus likely to be run over by the commercial vehicle.

SUMMARY OF THE INVENTION

One object of the present invention is to provide an anti-crash system of the initially mentioned type which is so designed that the risk for a car occupant involved in a head-on collision with a commercial vehicle is reduced.

In order to achieve these or other objects, under the front bumper of the commercial vehicle and generally at the same level as the bumper of the car a device is arranged forming a coacting part of the said commercial vehicle bumper and able to deflect a vehicle such as a car colliding with the commercial vehicle.

The anti-crash system in accordance with the invention makes it possible for a part of the kinetic energy to be converted into deforming energy by an energy absorbing structure when a collision takes place and furthermore at the same the deflection of the colliding car compensates for the unequal masses of the two vehicles, as long as the commercial vehicle is on the move and there is much less danger of the car being run over or curshed thereby.

The anti-crash device of the system may either be in the form of the bumper itself, a structure arranged underneath it such as a frontal spoiler, or in some cases both such components.

In one embodiment of the invention which is simple to manufacture the component serving as the anti-crash device is curved, that is to say made in the form of an arc, in longitudinal section, this however leading to and increase in the overall length of the vehicle.

As part of a further development of the invention the front spoiler or the bumper is so included in the overall system that prior to a collision such components may be moved outwards, with the aid of a suitable distance measuring system, into a position in which a deflection of the colliding car is possible. This design ensures on the one hand that normally the commercial vehicle has a standard length and nevertheless when a collision takes place the deformation displacement or path is increased and at the same time deflection is made possible.

The invention will now be described with reference to the accompanying drawings.

BRIEF DESCRIPTION OF THE DRAWING

FIGS. 3 to 8 each show a different design of the anti-crash device.

DETAILED DESCRIPTION OF WORKING EMBODIMENTS OF THE INVENTION

Figure 1:
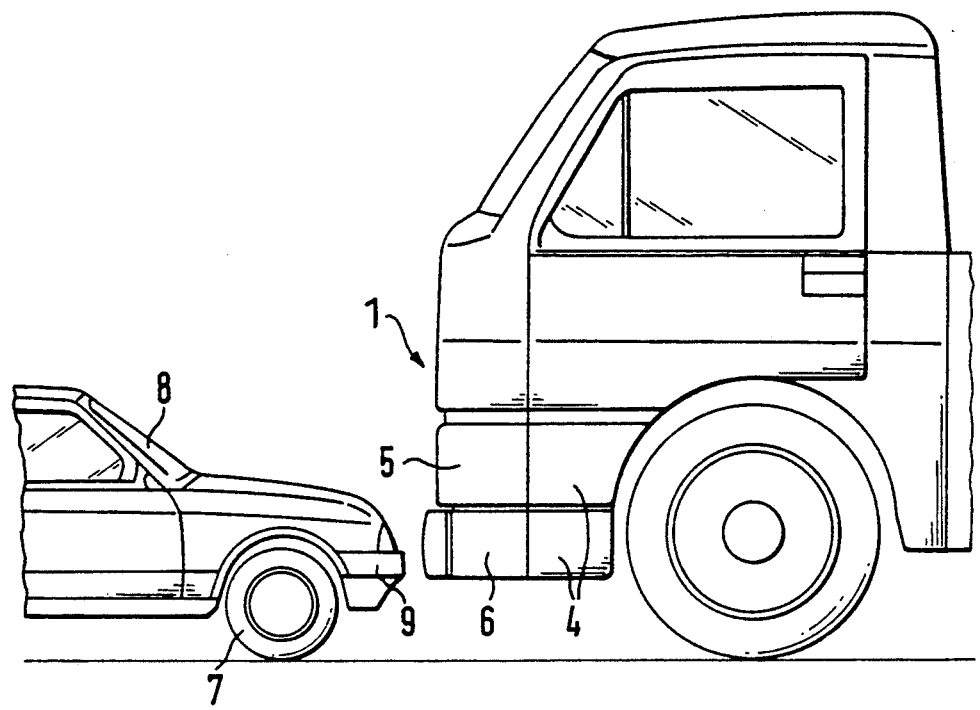
FIG. 1 shows the front ends of a commercial vehicle and of a car from the side in order to indicated events during a head-on collision.

The front part of a commercial vehicle may be seen from FIG. 1 to include the lower part 1 of the driver's cab, the front wheel 2, the fender 3, the chassis 4, the bumper 5 and a front spoiler 6 arranged underneath the bumper 5. A car may be seen to have a front wheel 7, the front part of the bodywork 8 and a bumper 9 integrated in the bodywork.

As will be clear the bumper 5 of the commercial vehicle is arranged at a subtantially higher level than the bumper 9 of the car so that when a head-on collision takes place the two bumpers 5 and 9 to not engage each other. If the front spoiler 6 of the commercial vehicle only performs an aerodynamic function, as will generally be the case, it will be relatively light in construction and will hardly be able to absorb any collision energy. The car would thus in this case not be substantially prevented from running under the commercial vehicle until it strikes the front end of the chasis 4 and is deformed to a greater or lesser extent. The bumper 5 of the commercial vehicle hardly plays any part, since it only crushes the bodywork, more specially, of the car so that in this respect as well only a small amount of energy is absorbed. As a result the energy is only taken up by the passenger compartment of the car which is crushed and will not have any sufficient space for survival.

Although there have been proposals to design the front spoiler as an energy absorbing structure so that a major fraction of the kinetic energy may be absorbed, there is still the disparity between the masses of the two vehicles so that the car will be pushed backwards or run over by the commercial vehicle which owing to its great momentum will continue to travel in the same direction.

In order to provide a remedy in addition to the energy absorbing design of the anti-crash device, the latter is so constructed that the colliding car is deflected thereby and the continued travel of the commercial vehicle does not cause any further damage.

Designs of such anti-crash devices are to be seen in the FIGS. 3 through 8.

Figure 3:
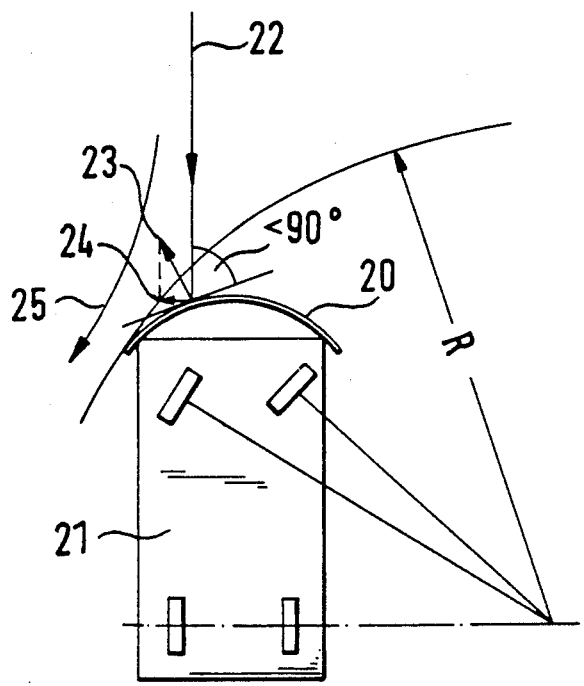

The working embodiment of the invention to be seen in FIG. 3 constitutes a technically simple construction in the case of which the anti-crash device, that is to say in the case the front spoiler 20 is curved forwards. The bumper 5 may also be curved forwards. In this respect it may in longitudinal section take the form of a circular arc whose radius is so selected that the anti-crash device 20 does not enlarge the turning circle R of the vehicle 21, that is to say the outline of the component 20 is within the turning circle R. Namely, the radius of curvature of device 20 is less than the turning circle R. The colliding vehicle is deflected onto a surface which provides force components 23, 24 based on direction 22 of travel to deflect the vehicle along the path as marked by the arrow 25.

In the design of FIG. 3 the overall length of the vehicle 21 is increased owing to the curvature of the anti-crash device 20 so that this design is suited to vehicles whose overall length is less than the maximum permissible vehicle length.

Figure 2:
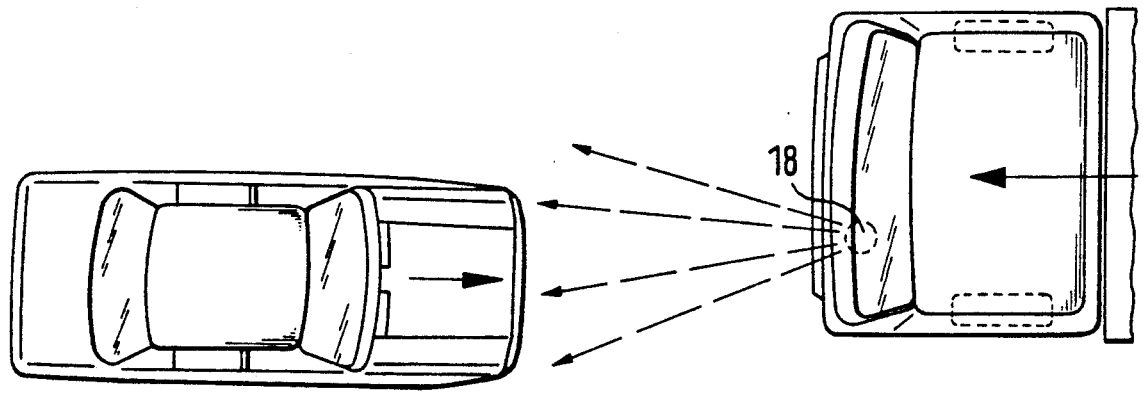
FIG. 2 is a plan view of the part in which a head-on collision between a commercial vehicle and a car is likely to take place.
Figure 4:
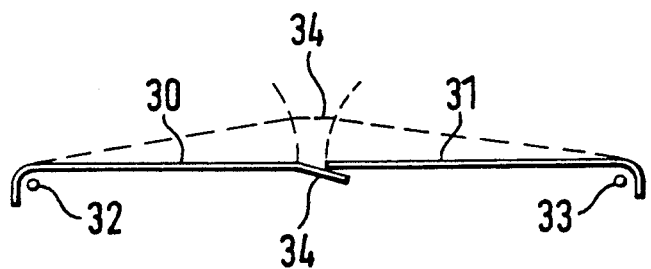

FIGS. 4 and 5 show designs which may also be used for vehicles which when fitted with a conventional bumper are at a maximum permissable length for such vehicles. These designs are essentially such that the deflecting component of the anti-crash system assumes the retracted position of a conventional bumper during normal driving operation and it is only when there is the danger of a collision that they are so displaced forwards, that is to say as to increase the length of the vehicle, that the protruding component causes deflection of the car. For this purpose an operating system is needed which detects the proximity of a frontally colliding vehicle and puts the displacing mechanism into operation. Such a crash situation is for instance to be seen in FIG. 2, in the case of which control system a measuring and range finding sensor 18, as for instance in the form of a conventional radar or laser system on the commercial vehicle, indicates the approach of the car 8 and, dependent on the speed of approach, on the distance between the car and the commercial vehicle and on the desired observation sector, activate an operating mechanism of the anti-crash device and thus cause the deflecting components to be moved outwardly to their operative positions. This all takes place a short time prior to impact and is performed after certain criteria, which are determined empirically or by calculation, of the sensor signals have been fulfilled.

The anti-crash device may be made in two parts, as is shown in FIG. 4. During normal operation the two component parts 30 and 31, which are for instance respectively pivoted laterally on the vehicle at 32 and 33, have their respective free ends resting on the front of the vehicle, such setting being shown in full lines in FIG. 4. Prior to a collision the two component parts 30 and 31 are swung forwards so that on inclined impact surface is formed thereby as shown in broken lines. In order to avoid a gap between the two free ends of the components 30 and 31 in the moved-forward position, component 30 is provided with a section 34 bent towards the vehicle and projecting in the non-operative setting behind the second component 31. This section closes the gap which would otherwise exist in the moved-out position. The components 30 and 31 which are able to be moved outwards may be made straight in longitudinal section or may be slightly curved.

However, instead of connecting the section 34 with the component 30, it may also be made separately, as shown in FIG. 5, and be moved outwards independently. In FIG. 5 the component 12 is able to be moved outwards independently of components 10 and 11. The lateral components 10 and 11 are able to be pivoted about vertical axes at 14 and 15, respectively, near their respective outer ends and are supported on the chassis construction 4 in an energy-absorbing manner. To this extent the desing is the same as in FIG. 4. The third and middle ccomponent 12 is in the form of a carriage able to be shifted in the length direction of the vehicle in translation. The anti-crash system normally assumes the operational position shown at I in broken lines in FIG. 5. The resetting into the position II is caused prior to a collision by the above-mentioned measuring and distance regulating system.

In this case as well the deflecting components may be straight or curved in longitudinal section. For causing outward motion of the deflecting components 10, 11 and 12 hydraulic or pneumatic cylinders with piston rods 17 as shown for instance in FIG. 5, may be used. Each deflecting component is designed so as to be sufficiently resistant to the collision forces, the anti-crash system, however designed so as to be deformable in order to absorb kinetic energy, for example by having a sandwich or skeleton structure. Anti-crash systems with components able to be moved outwards furthermore offer the advantage that the deformation displacement or path is increased, this providing a further contribution to mitigating the consequences of a collision.

In accordance with a particularly advantageous form of the invention the displacement on deformation of the anti-crash device for a head on collision is increased (without having to make the vehicle longer during normal operation) so that the risk of the two vehicles being pushed into each other is reduced. In this case the commercial vehicle assumes a larger proportion of the energy absorbing function than is the case with normal impact absorbers.

The part of the anti-crash device able to be moved outwards may in this case either be the bumper itself, a device arranged thereunder, as for example a front spoiler, or in certain cases the two components at the same time or parts thereof. The displacement will, in accordance with the design of the front part of the vehicle, either be a parallel or an oblique displacement, or however, a pivotal displacement as well.

The outward motion may, in accordance with one form of the invention, be caused to take place suddenly. For this purpose high-pressure gas accumulators, air bags, as have been proposed for protecting vehicle occupants, springs or other energy storing systems, in the case of which a thrust force may be spontaneously produced, may be utilized.

In order to start the outward motion it is possible to use a measuring and range finding sensor with an associated controlling system, with which a car may be detected prior to any collision and a control signal produced in good time before such collision so that the outward motion of the device is brought about. The sensor may preferably be a sensor able to operate in fog or mist and as already fitted to the vehicle. Such a sensor is used to adjust the minimum distance from the vehicle in front in accordance with the visual distance in fog or, respectively, by braking in order to keep to the minimum distance. By including a further control characteristic in the program it is then possibly to simultaneously use the fog protective system simultaneously in order to operate the means for moving out the anti-crash device.

Figure 6:
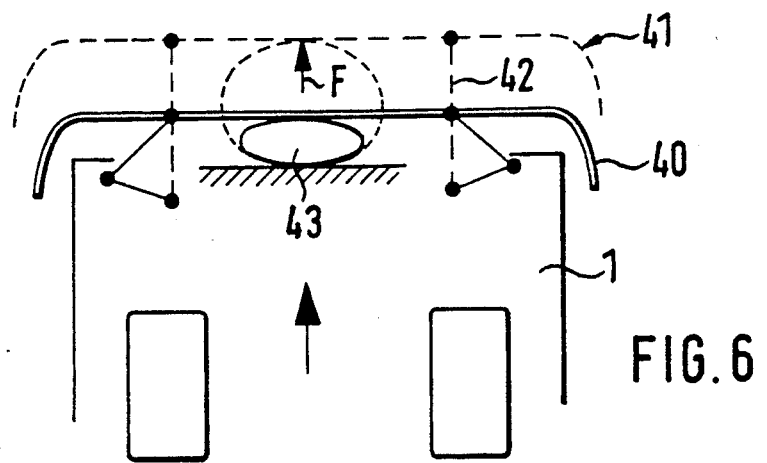
Figure 7:
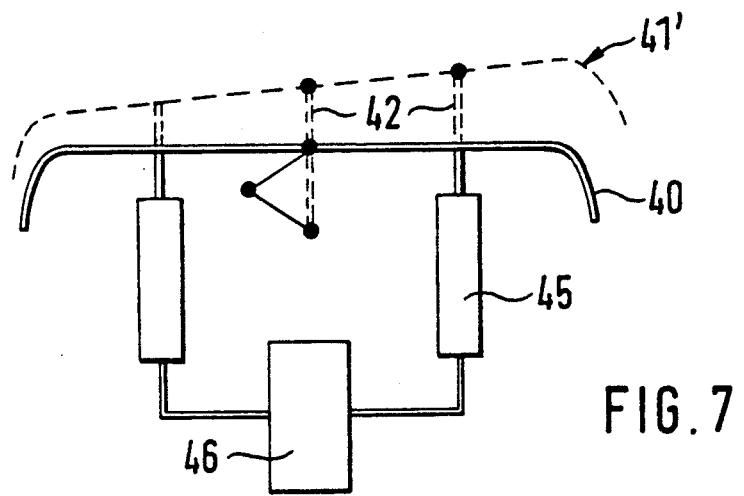
Figure 8:
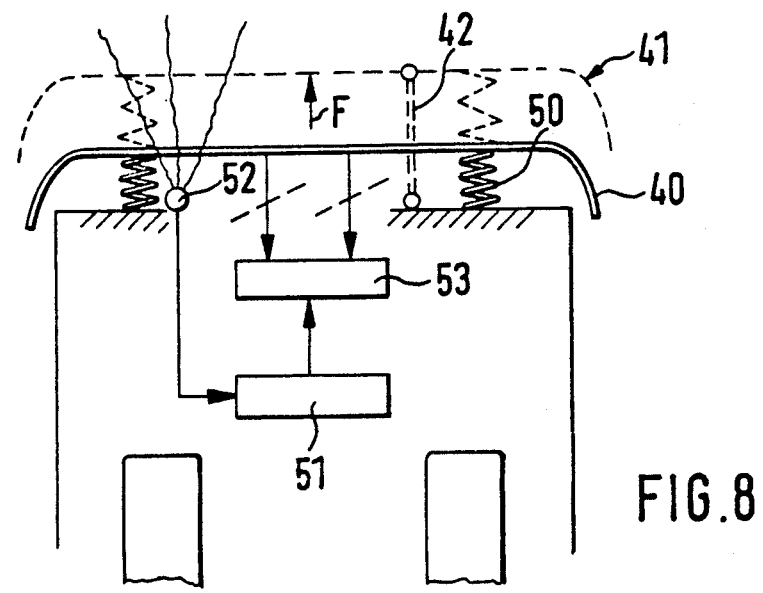

FIGS. 6 through 8 diagrammatically show anti-crash devices in the case of which the kinetic energy is absorbed when any collision takes place. On the vehicle 1 there is a bumper or spoiler 40, serving as an anti-crash device, at the position normal for such a device on a commercial vehicle, although it is so mounted that when a forwardly acting force F is applied, the bumper 40 may be moved forwards. In the moved-forwards position 41 of the bumper the latter is also connected with an energy absorbing structure, which is symbolized in the drawing by pivoting rods 42.

In order to move out the anti-crash device 41 and 42 there is, in the system of FIG. 6, and air bag 43, which is attached to the chassis of the vehicle behing the bumper 40 and which when needed is blown up in an explosive manner so that it moves the bumper 40 forwards into the position 41. Then the deformation on the commercial vehicle is extended in a forward direction so that the absorption of energy starts when there is a larger distance between the car and the chasis 4.

In place of the air bag 43 it is possible to utilize a pneumatic or hydraulic system, which as shown in FIG. 7 may consist of pressure pistons as shown in FIG. 7, which are operated by gas from a high pressure gas accumulator 46. In the case of a design usin deformable pressure pistons 45 the latter simultaneously assume at least a part of the energy absorbing function.

FIG. 8 shows a design in which the force F causing outward motion is produced by a preloaded spring system 50.

The above described designs may also be designed to store potential energy which is then able to be converted in a sudden or explosion-like manner into kinetic energy. In order to bring about the outward motion there is an operating device 51 as shown in FIG. 8, which is operated by signals from a measuring and range finding sensor 52 acting via a servo element 53 in order to start the outward motion, as for instance by unlatching the preloaded spring system 50.

However it is also possible to use advancing or outwardly moving devices which do not act in a sudden or explosion-like manner. Such a device may, for example, include the pressure cylinder 45, shown in FIG. 7, in conjunction with a pump, not shown.

In FIGS. 6 and 8 parallel displacements of the entire component 40 (41) are shown while FIG. 7 shows a combined pivotal and translatory motion (40,/41'). The design for lengthening the displacement on deformation may however assume many different possible forms. Apart from being the entire bumper or the entire spoiler, the component to be moved may be a part thereof. Another possibility is for the component to be separated into separately moving parts, the individual parts being able to be moved in the same or in a different manner. An example of this is the division of the component into two side parts, which are pivotally mounted, and a middle part which is arranged so that it may be moved parallel to itself in a forward direction.

What is claimed is:

1. An anti-crash system for a commercial vehicle, said vehicle comprising a front bumper at an elevational above a bumper of a passenger vehicle, a front spoiler beneath said front bumper at the level of the bumper of the passenger vehicle, means for displacing said front spoiler from a retracted inoperative position underneath said front bumper to an extended, operative position forwardly of said front bumper, and means elastically supporting said front spoiler in said extended, operative position for cushioning impact between said spoiler and a passenger vehicle, said spoiler including a plurality of overlapping segments which slide on one another as said spoiler moves between said operative and inoperative positions, said segments in said operative position being angulated to apply force to the passenger vehicle to deflect the passenger vehicle laterally when the commercial vehicle and the passenger vehicle impact in a direction longitudinally of the commercial vehicle.

2. A system as claimed in claim 1 wherein said plurality of overlapping segments include a central segment and two lateral segments, said segments in said retracted position extending parallel to one another whereas in said extended position, said lateral segments form an angle with said central segment.

3. A system as claimed in claim 2 comprising a pivot support for each lateral segment, said means for displacing said front spoiler comprising means for applying a control force to each lateral segment at a location spaced from its respective pivot suport whereby each lateral segment undergoes pivotal movement when traveling between said operative and inoperative positions.

4. A system as claimed in claim 3 wherein said means for applying a control force comprises a piston and cylinder arrangement.

5. A system as claimed in claim 1 wherein said means for displacing said front spoiler and for elastically supporting said front spoiler comprises fluid power means.

6. A system as claimed in claim 5 wherein said fluid power means comprises a high pressure gas accumulator.

7. A system as claimed in claim 1 wherein said means for displacing said front spoiler comprises an air bag.

8. A system as claimed in claim 14 wherein said means for displacing said front spoiler comprises an air bag.

9. A system as claimed in claim 1 wherein said means elastically supporting said front spoiler comprises a linkage including pivoting rods.

10. A system as claimed in claim 1 wherein said spoiler is curved.

11. A system as claimed in claim 10 wherein the spoiler has a radius of curvature which is less than the turning circle of the commercial vehicle.

12. A system as claimed in claim 1 wherein said front spoiler in said operative position is at said level beneath said front bumper.

* * * * *

UNITED STATES PATENT AND TRADEMARK OFFICE
CERTIFICATE OF CORRECTION

PATENT NO. : 5,042,858
DATED : August 27, 1991
INVENTOR(S) : Klaus SCHUBERT, Gerhard RIECK It is certified that error appears in the above-identified patent and that said Letters Patent is hereby corrected as shown below:

Title page, Item 73 - Change the printing of the Assignee name from:

"Man Nutzfahrzeuge GmbH, Munich" to

"MAN Nutzfahrzeuge GmbH, Munich"

Signed and Sealed this

Thirteenth Day of April, 1993

*Attest:*

STEPHEN G. KUNIN

*Attesting Officer*     *Acting Commissioner of Patents and Trademarks*